US012699801B2

(12) United States Patent
   Sethi et al.

(10) Patent No.: US 12,699,801 B2
(45) Date of Patent: *Aug. 4, 2026

(54) CONSTRUCTING AND ENFORCING ACCESS CONTROL POLICIES

(71) Applicant: Formagrid Inc, San Francisco, CA (US)

(72) Inventors: Raghav Sethi, San Francisco, CA (US); Stephen Beesley Ball, San Francisco, CA (US); Emmett Fred Nicholas, San Francisco, CA (US); Caleb Wesley Meredith, New York, NY (US); Anuj Bheda, San Francisco, CA (US); Samuel Gilbert Keller, San Francisco, CA (US)

(73) Assignee: Formagrid Inc, San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/923,769

(22) Filed: Oct. 23, 2024

(65) Prior Publication Data

US 2025/0045449 A1 Feb. 6, 2025

Related U.S. Application Data

(63) Continuation of application No. 18/483,723, filed on Oct. 10, 2023, now Pat. No. 12,153,703.

(Continued)

(51) Int. Cl.
   *G06F 21/00* (2013.01)
   *G06F 21/62* (2013.01)

(52) U.S. Cl.
   CPC .. *G06F 21/6227* (2013.01); *G06F 2221/2141* (2013.01)

(58) Field of Classification Search
   None
   See application file for complete search history.

(56) References Cited

U.S. PATENT DOCUMENTS

| | | | |
|---|---|---|---|
| 7,908,647 B1 | 3/2011 | Polis et al. | |
| 7,958,206 B2 | 6/2011 | Rider et al. | |

(Continued)

OTHER PUBLICATIONS

PCT International Search Report and Written Opinion, PCT Application No. PCT/IB2023/060175, Jan. 26, 2024, 10 pages.

*Primary Examiner* — Maung T Lwin
(74) *Attorney, Agent, or Firm* — Fenwick & West LLP

(57) ABSTRACT

A computing system may receive a schema of user interface comprising an arrangement of interface elements, each element configured to display data from cells of a database. The system may receive a user permission for the user interface and an element permission for an interface element. The system may generate a policy object for the user interface based on the user permission and the element permission. The policy object specifies which cells of the database can be accessed by the user interface. The system may receive a query from a client device associated with a user to implement a local instance of the user interface. The system may serve the query according to the policy object, where serving the query includes providing data from the database that the user interface provides access to without providing other data from the database that should not be accessible according to the policy object.

21 Claims, 9 Drawing Sheets

Interface Generator
403

Related U.S. Application Data

(60) Provisional application No. 63/414,862, filed on Oct. 10, 2022.

(56) References Cited

U.S. PATENT DOCUMENTS

| | | | |
|---|---|---|---|
| 9,680,876 B2 | 6/2017 | Porras | |
| 9,888,039 B2 * | 2/2018 | Elliot | H04L 63/10 |
| 11,244,238 B2 * | 2/2022 | Jagota | G06F 16/9024 |
| 2009/0063691 A1 | 3/2009 | Kalofonos et al. | |
| 2011/0289601 A1 | 11/2011 | Bellwood et al. | |
| 2014/0101564 A1 | 4/2014 | Ward et al. | |
| 2017/0300672 A1 | 10/2017 | Kauerauf et al. | |
| 2021/0014233 A1 | 1/2021 | Kuppannan et al. | |
| 2021/0141920 A1 * | 5/2021 | Khurana | G06F 21/31 |
| 2022/0035519 A1 | 2/2022 | Rathod | |
| 2022/0215107 A1 | 7/2022 | Wong et al. | |
| 2023/0195924 A1 * | 6/2023 | Bames | G06F 16/24552 |
| | | | 726/26 |

* cited by examiner

100

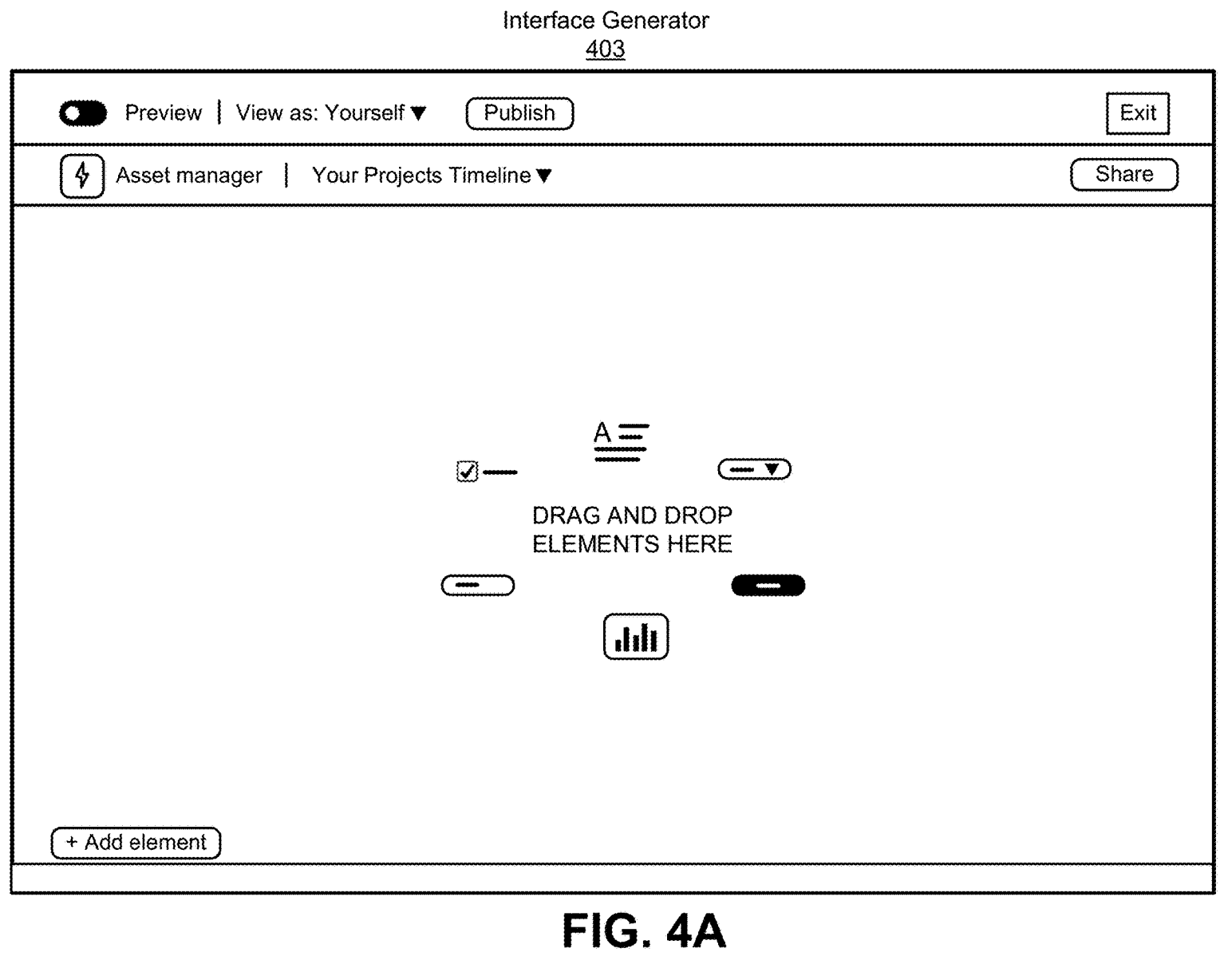

Interface Generator
403

Exit

Share

Preview | View as: Yourself ▼    Publish

Asset manager  |  Your Projects Timeline ▼

A≡

DRAG AND DROP
ELEMENTS HERE

+ Add element

FIG. 4A

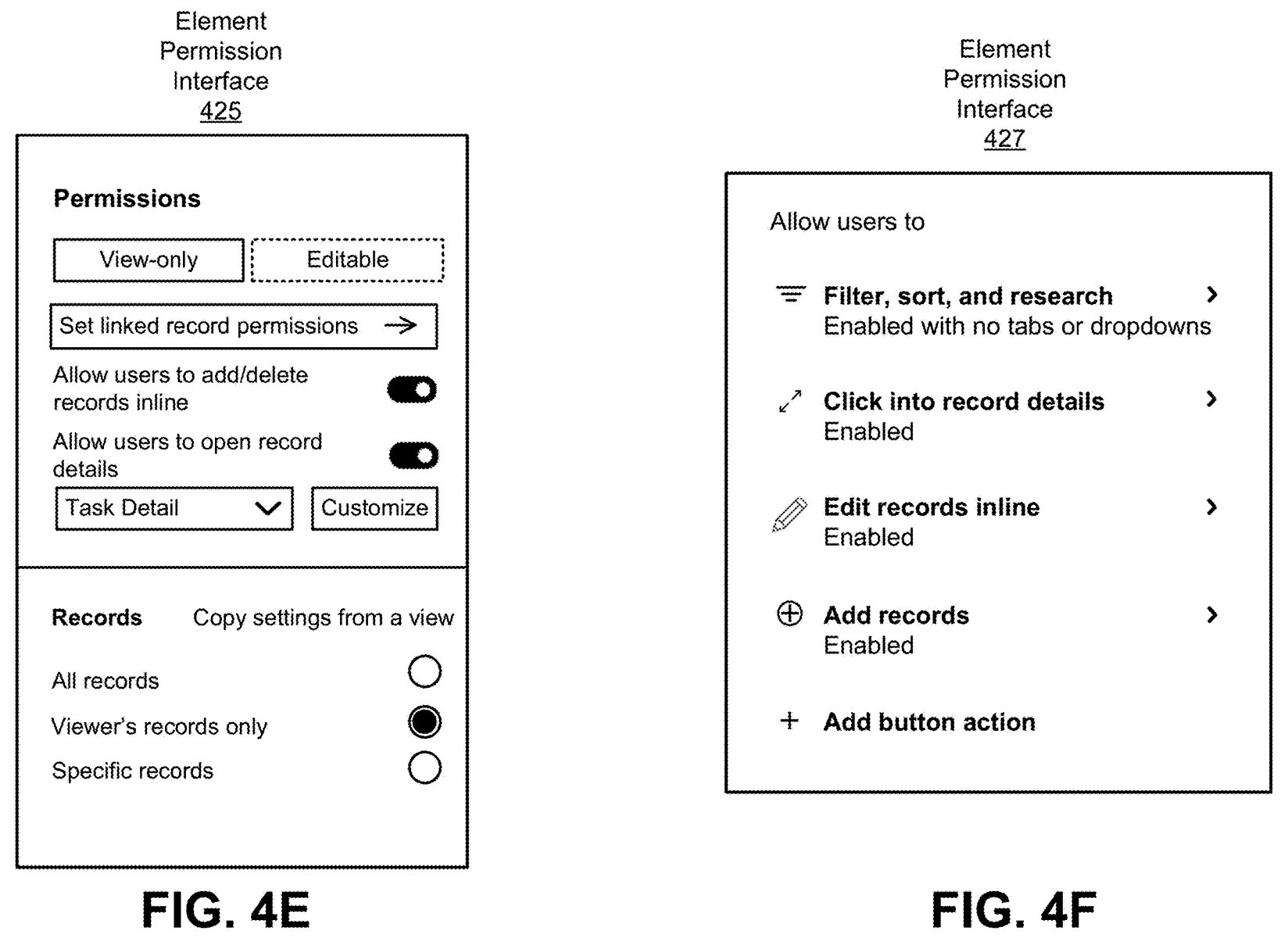

Element
Permission
Interface
427

Allow users to

≡ Filter, sort, and research
Enabled with no tabs or dropdowns    ∨

↙ Click into record details
Enabled    ∨

✎ Edit records inline
Enabled    ∨

⊕ Add records
Enabled    ∨

+ Add button action

FIG. 4F

Element
Permission
Interface
425

Permissions

[ View-only ] [ Editable ]

Set linked record permissions →

Allow users to add/delete records inline ⬤

Allow users to open record details ⬤

[ Task Detail ∨ ] [ Customize ]

Records    Copy settings from a view

All records ○

Viewer's records only ⬤

Specific records ○

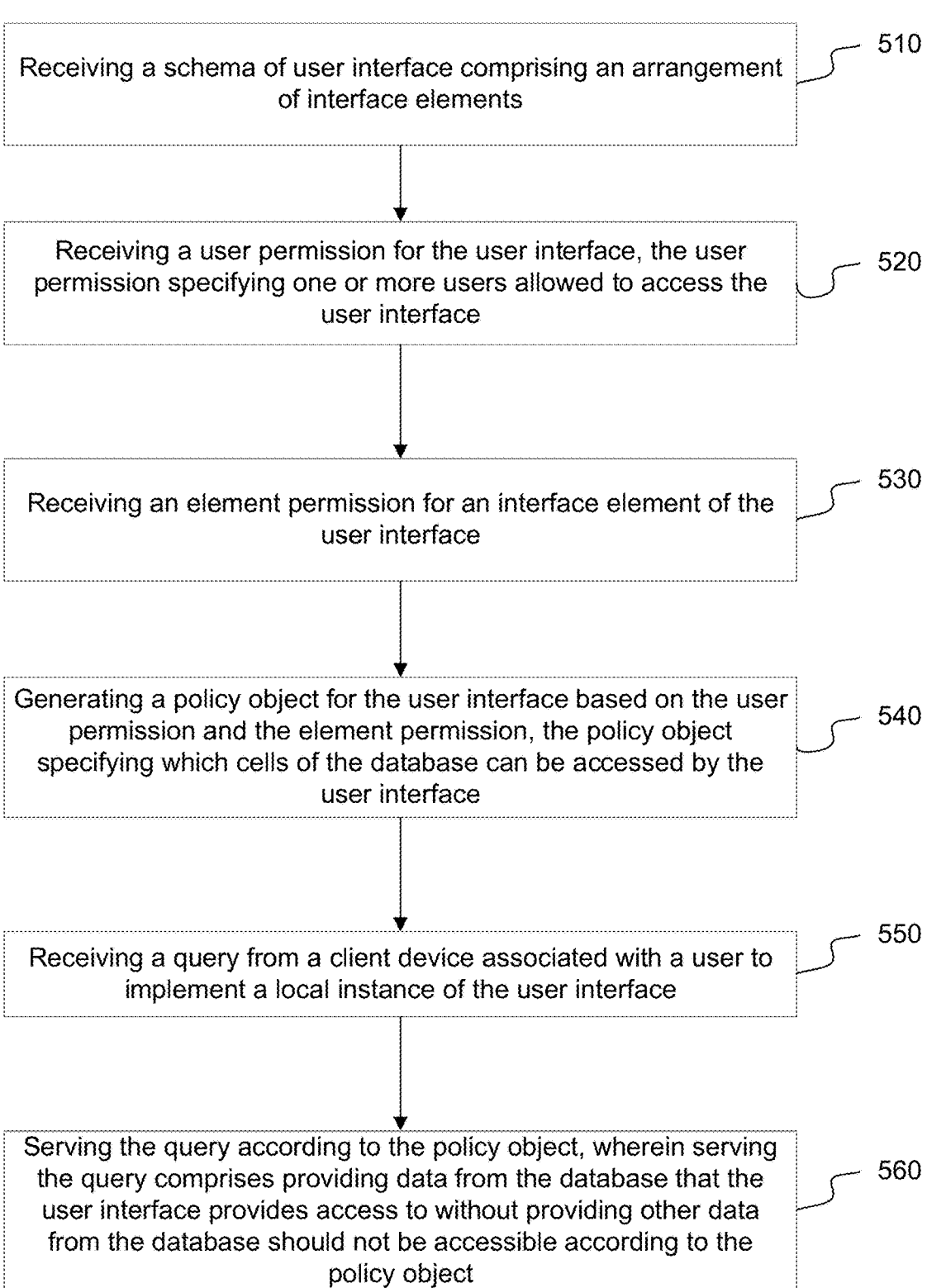

510 — Receiving a schema of user interface comprising an arrangement of interface elements 520 — Receiving a user permission for the user interface, the user permission specifying one or more users allowed to access the user interface 530 — Receiving an element permission for an interface element of the user interface 540 — Generating a policy object for the user interface based on the user permission and the element permission, the policy object specifying which cells of the database can be accessed by the user interface 550 — Receiving a query from a client device associated with a user to implement a local instance of the user interface 560 — Serving the query according to the policy object, wherein serving the query comprises providing data from the database that the user interface provides access to without providing other data from the database should not be accessible according to the policy object

FIG. 5

CONSTRUCTING AND ENFORCING ACCESS CONTROL POLICIES

CROSS REFERENCE TO RELATED APPLICATIONS

This application is a continuation of U.S. application Ser. No. 18/483,723, filed Oct. 10, 2023, which claims the benefit of U.S. Provisional Application No. 63/414,862 titled "Constructing and Enforcing Access Control Policies in a Realtime System based on a Visual Application Designer," filed on Oct. 10, 2022, each of which is incorporated herein by reference.

BACKGROUND

1. Technical Field

The subject matter described relates generally to constructing and enforcing access control policies for customized user interfaces.

2. Background Information

User interfaces may be used to display data from a database. However, these user interfaces may expose portions of the database that are unintentional or undesired (e.g., confidential information). These user interfaces may expose these portions visually or otherwise (e.g., the client loads data from the database, thus exposing it even if that data is not displayed by an interface).

SUMMARY

Embodiments herein relate to constructing and enforcing access control policies for user interfaces, especially for customized user interfaces that can dynamically change in real time (e.g., due to users making changes simultaneously).

In some aspects, the techniques described herein relate to a method including: receiving a schema of user interface including an arrangement of interface elements, each element configured to display data from cells of a database; receiving a user permission for the user interface, the user permission specifying one or more users allowed to access the user interface; receiving an element permission for an interface element of the user interface, the element permission specifying data (e.g., records) of the interface element accessible to users of the user interface; generating a policy object for the user interface based on the user permission and the element permission, the policy object specifying which cells of the database can be accessed by the user interface; receiving a query from a client device associated with a user to implement a local instance of the user interface; and serving the query according to the policy object, wherein serving the query includes providing data from the database that the user interface provides access to without providing other data from the database that should not be accessible according to the policy object.

BRIEF DESCRIPTION OF THE DRAWINGS

FIGS. 4A-4B illustrate an example of a user designing a user interface (via a client device).

FIGS. 4E and 4F are example element permission interfaces that enable a user to specify an element permission for an element.

FIG. 5 illustrates a method for implementing a customized data policy object for a user interface.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements unless the context indicates otherwise.

I. Example Systems

Figure 1:
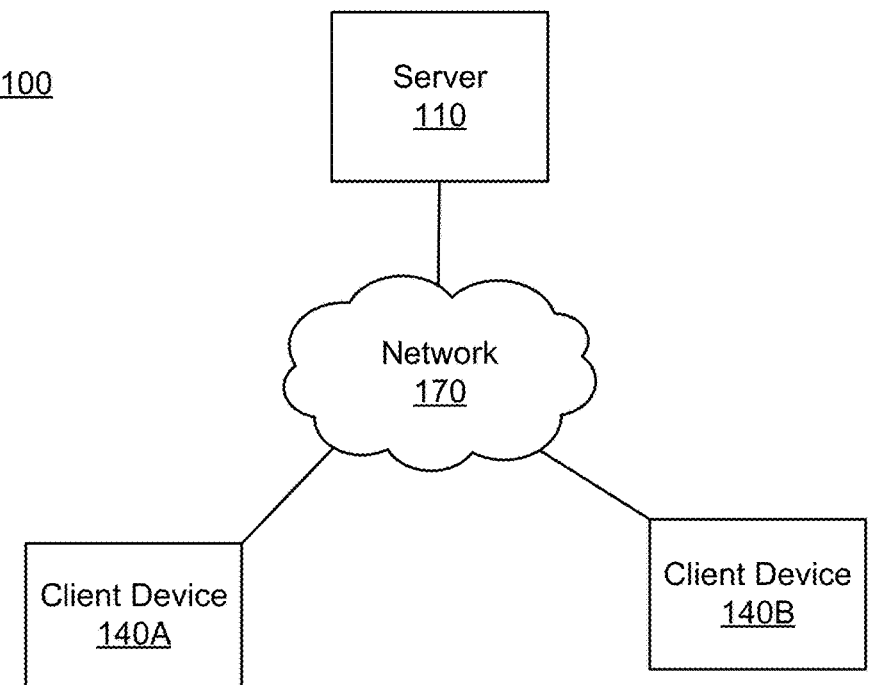
FIG. 1 is a block diagram of a networked computing environment suitable for enabling user interfaces and permissions, according to one or more embodiments.

FIG. 1 is a block diagram of a networked computing environment suitable for enabling user interfaces, databases, and permissions, according to one or more embodiments. In the embodiment shown, the networked computing environment 100 includes a server 110, a first client device 140A, and a second client device 140B, all connected via a network 170. Although two client devices 140 are shown, the networked computing environment 100 can include any number of client devices. In other embodiments, the networked computing environment 100 includes different or additional elements. In addition, the functions may be distributed among the elements in a different manner than described.

The server 110 hosts and manages databases and user interfaces. In one embodiment, the server 110 manages permissions for user interfaces dynamically such that only the data from a database that is needed to provide the intended user interface is provided to client devices 140. The permissions (and thus data needed) by a particular user interface may be determined by stepping through or otherwise traversing the various elements of the user interface and building a permission set that may be stored in a policy object. Thus, data that should not be accessible by a particular client device 140 (e.g., confidential information) is not unintentionally exposed by provision of the user interface. Various embodiments of the server 110 is described in greater detail with respect to FIG. 2.

The client devices 140 are computing devices with which users can access and edit the databases and interfaces managed by the server 110. Example client devices include desktop computers, laptop computers, smartphone, tablets, etc. The client devices 140A and 140B may enable users to interact with the databases via a user interface accessed via a browser, a dedicated software application executing on the client devices, or any other suitable software.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
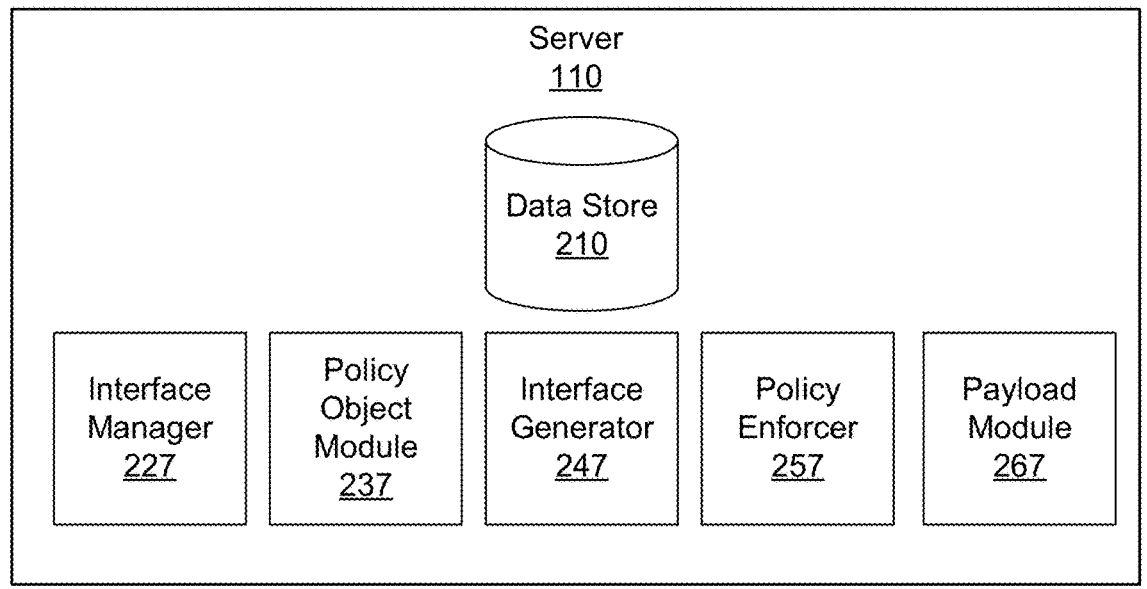
FIG. 2 is a block diagram of a server, according to one or more embodiments.

FIG. 2 is a block diagram of the server 110, according to one or more embodiments. In the embodiment shown, the server 110 includes modules including a data store 210, an interface manager module 227, a policy object module 237, an interface generator module 247, a policy enforcer module 257, and a payload module 267. In other embodiments, the server 110 includes different or additional modules. In addition, the functions may be distributed among the modules in a different manner than described.

The data store 210 includes one or more computer-readable media that store databases managed by the server 110. Although the data store 210 is shown as a single element within the server 110 for convenience, the data store 210 may be distributed across multiple computing devices (e.g., as a distributed database). Similarly, individual databases may be hosted by client devices 140 (or other computing devices) with the server 110 managing synchronization between databases but not storing the databases themselves.

As used herein, "data" may refer to a set of structured data. For example, data may be a table, a spreadsheet, or a JSON file. A "database" may refer to a collection of structured data (e.g., in table format) for which relations between the data can be derived. For example, the database may comprise tables stored in data store 210, and the relations between the tables may be derived using a common column. The data or the database may be structured as a two-dimensional matrix of cells, and as such have rows and columns. A cell refers to an individual unit of data and its metadata. A cell may have a type (e.g., number, text, Boolean, error), a value (e.g., a user-entered value or a computed result), a formula value (e.g., an expression), a formatted value (e.g., the value formatted to a string such as $1.23), a format (e.g., a number format such as a date (Nov. 12 2013) or a text format such as background color, text color, typeface, font size, bold, italic, underline, strikethrough, etc.), a text format run (e.g., a section of text within the cell with a particular format), a hyperlink (e.g., a URL), or a pivot table anchored to the cell.

Figure 3:
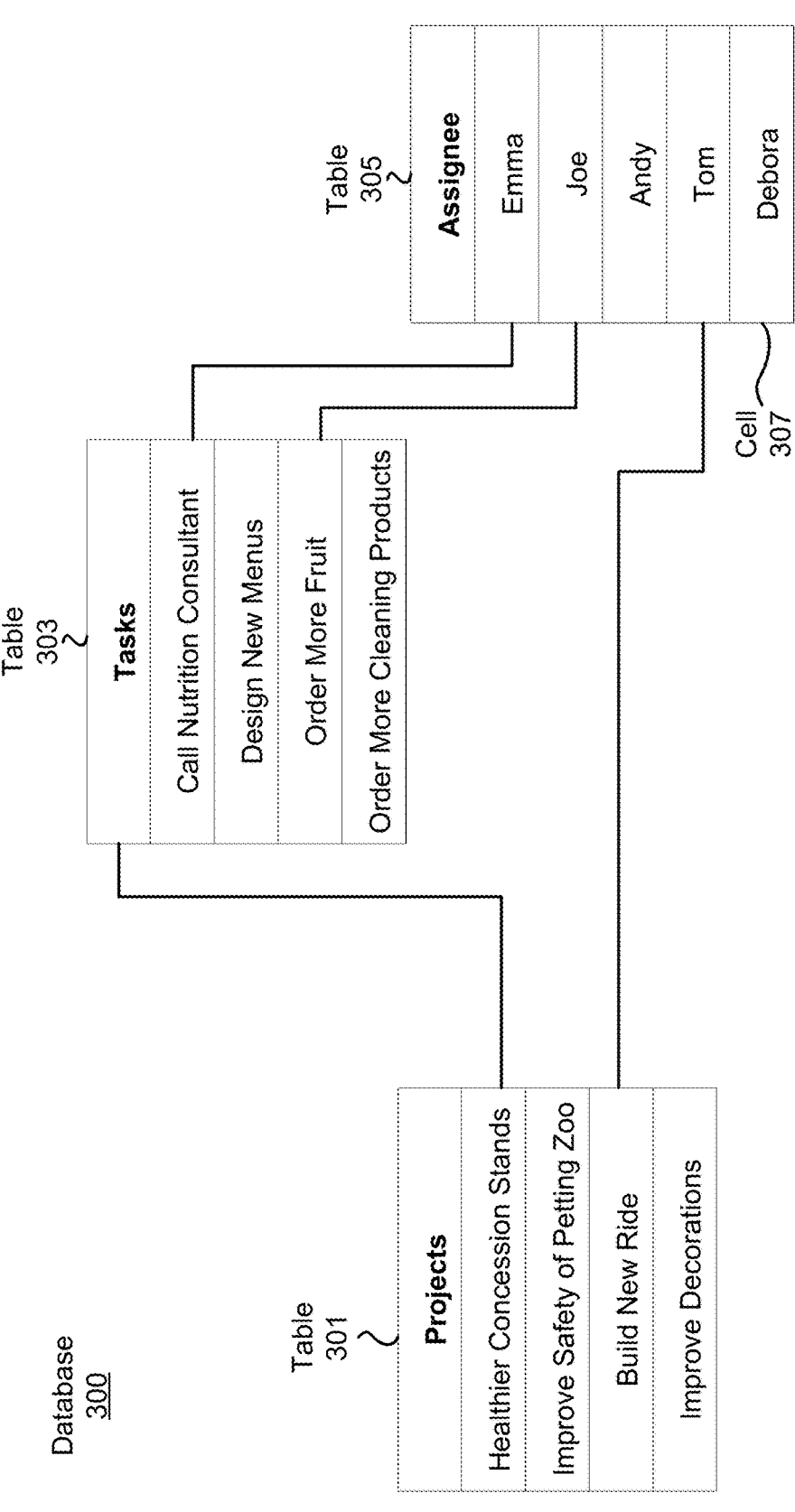
FIG. 3 is a diagram of an example database.

FIG. 3 is a diagram of an example database 300. The database 300 includes three tables 301, 303, 305 and relations between the tables. Each table in FIG. 3 includes multiple cells (e.g., cell 307). In the example of FIG. 3, each table includes a single column and multiple rows. Table 301 lists example projects (e.g., "Healthier Concession Stands" and "Improve Safety of Petting Zoo"). Table 303 lists example tasks for the project "Healthier Concession Stands"

of table 1 (e.g., "Call Nutrition Consultant" and "Design New Menus"). Table 305 lists assignees that can be assigned to projects in table 301 and tasks in table 303. In the example of FIG. 3, "Emma" and "Joe" are each assigned to a single task in table 303 and Tom is assigned to the "Build New Ride" project of table 301. Database 300 may include additional tables not illustrated in FIG. 3, such as additional tables that list tasks for other projects in table 301.

I.A Generating Interfaces

Referring back to FIG. 2, the interface manager 227 enables a user (via a client device 140) to construct a user interface that selectively displays data from a database (e.g., database 300). Additionally, an interface may allow a user to edit data in the database. For example, if the database includes a table of tasks for a project and the status of each task, a user may add or remove tasks or change the status of a task by interacting with the interface. For convenience, interfaces are described herein as displaying data from a single database. However this is not required. An interface may display data from multiple databases, and multiple different interfaces may display data from a single database.

An interface may include an arrangement of one or more elements. An element is a portion of the interface that displays data according to a predetermined format. Some elements display data of a database according to a predetermined format. For example, some elements display data from cells of a database (e.g., database 300). Data from a cell displayed in an element may be referred to as a "record." An example element is a list, a grid, a gallery, a calendar, a timeline, and a chart. Among other possible element types, an element may be a multi-record element, a single-record element, or a presentational element. A multi-record element displays multiple records, thus displaying data from multiple cells. A single-record element displays a single record, thus displaying data from a single cell. A presentational element does not display a record (e.g., a presentation element just includes text providing instructions on how to use the interface). A single-record element may be linked to a multi-record element (e.g., a single-record element displays data from a cell based on a record selected in the multi-record element). Element types are further described below in the context of various examples.

Figure 4B:
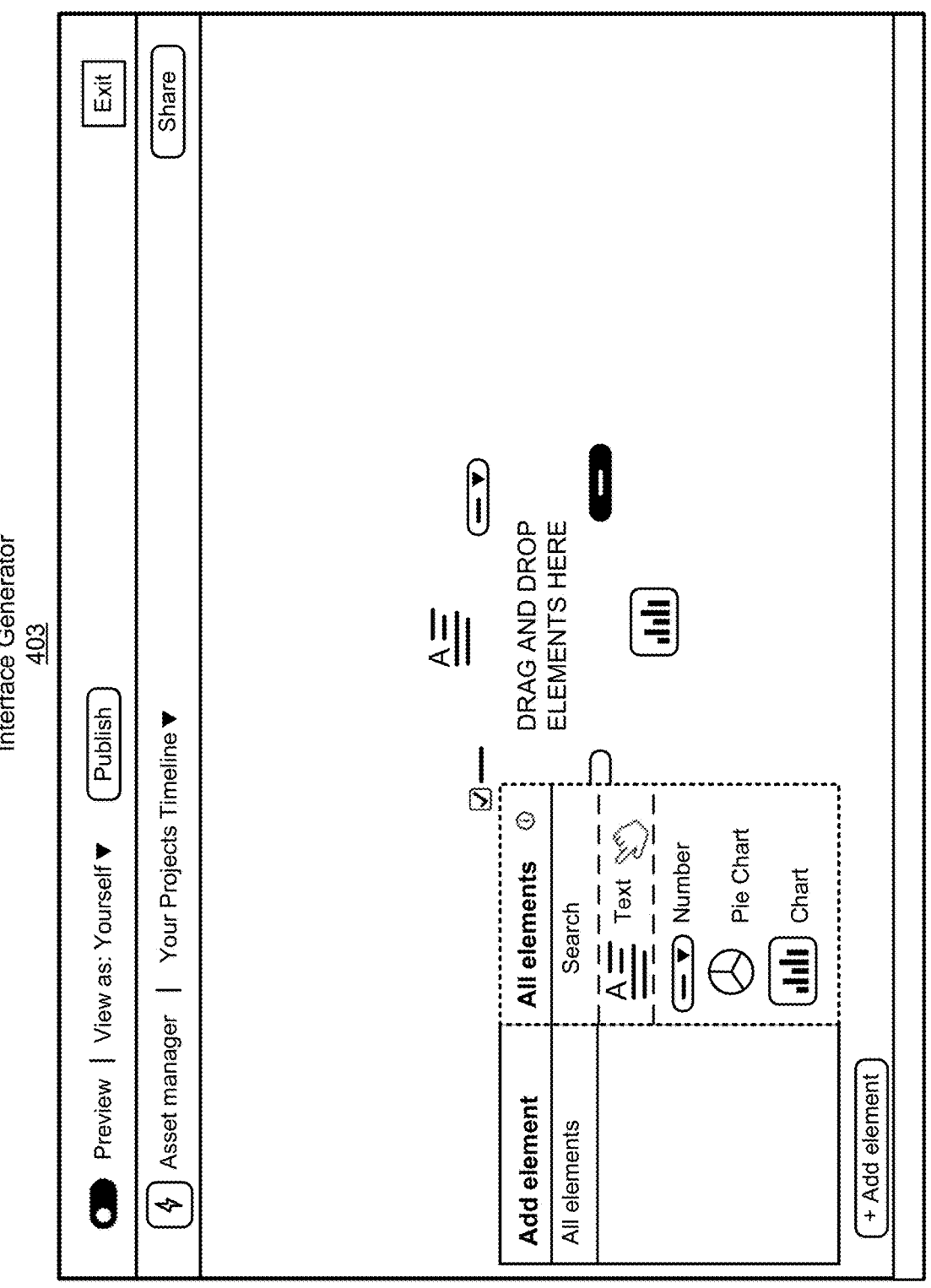
Figure 4C:
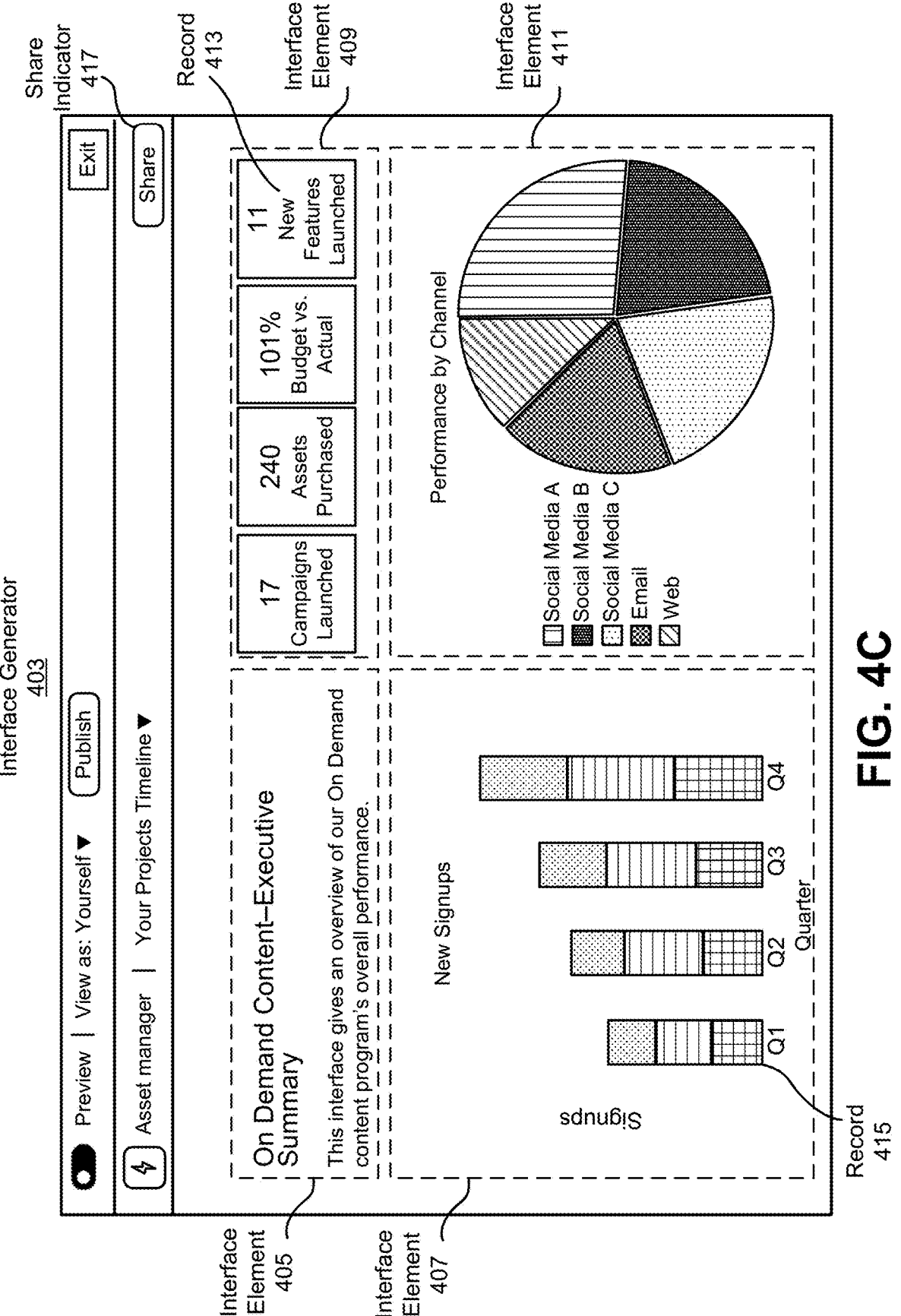
FIG. 4C illustrates a draft user interface with four interface elements.

FIGS. 4A-4C illustrate an example of a user designing a user interface (via a client device 140). FIGS. 4A and 4B illustrate an interface generator 403 which allows the user to design an interface. The user can add elements by selecting the "add element" button at the bottom and dragging an element to the center of the screen. FIG. 4C illustrates a draft interface with four interface elements. Element 405 is a text box displaying text from a cell of a database (or it may be a presentational element). Element 407 is a bar graph plotting data from cells of the database. Element 409 is a number element that displays data from cells of the database. Element 411 is a pie chart plotting data from cells of the database. Record 413 is an example record of element 409 and record 415 is an example record of element 407. For clarity, note that the data displayed by the elements in FIG. 4C does not correspond to the data in database 300. An example interface generator with elements displaying data from database 300 may include, for example, a first element listing projects from table 301 (this may be a multi-record element), a second element listing tasks from table 303 (e.g., it lists tasks for the project selected in the first element, and a third element listing assignee from table 305. The third element is an example of a single-record element linked to the first or second element (e.g., it lists the assignee for the project or task selected in the first or second element (this may be based on the table relations illustrated in FIG. 3)).

Referring back to FIG. 2, the interface manager 227 enables a user constructing an interface to specify a "user permission" for the interface. A user permission provides other users the ability to access the interface (these users may be referred to as "collaborators"). Providing a user access an interface may or may not grant a that user access to the database. Among other advantages, granting access to an interface but not to the database enables the interface to present tailored or custom information to a collaborator without allowing the collaborator to view potentially harmful or confidential information in the database. The interface manager 227 may enable the user to assign a permission level to a collaborator, such as creator, editor, commenter, or read only. The creator permission level enables the collaborator to (e.g., fully) edit the interface. For example, a creator collaborator is able to add a new element to the interface. An editor collaborator can edit records of elements in the interface (thus editing cells in the database) but not edit the elements themselves (e.g., add a new element). A commenter collaborator can comment on records but not edit records. A read only collaborator can view the interface but not edit or comment on the interface.

Figure 4D:
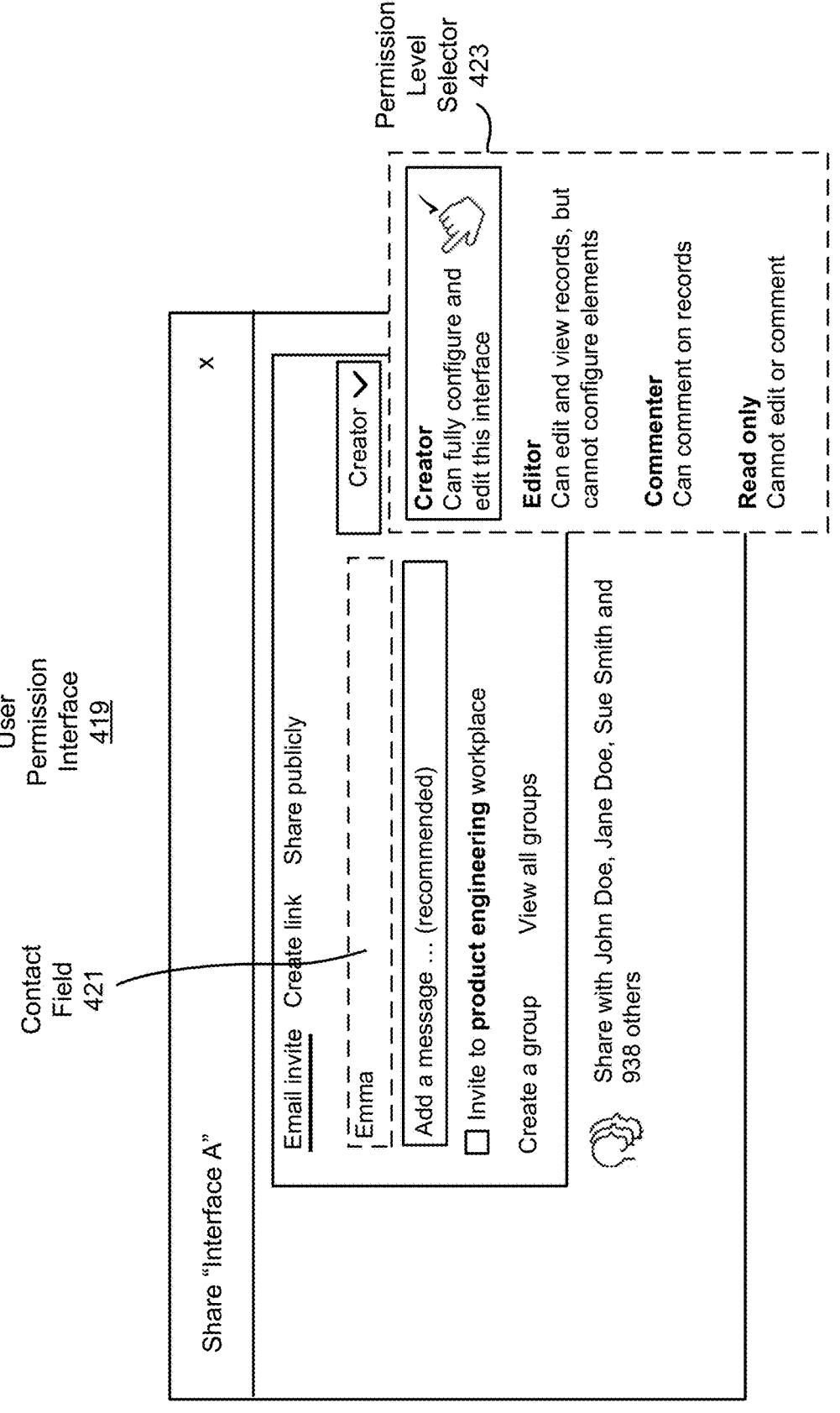
FIG. 4D illustrates an example user permission interface.

In the example of FIG. 4C, a user can specify a user permission by first selecting the share indicator 417. Responsive to this, the interface generator 403 may display the example user permission interface 419 illustrated in FIG. 4D. The user permission interface 419 includes a contact field 421 where a user can specify identifying information for a collaborator (e.g., an email address). The user permission interface 419 also includes a permission level selector 423, which allows the user to specify the permission level for a collaborator.

Referring back to FIG. 2, in addition to, or alternative to, a user assigning permissions for an interface (e.g., via 419), the interface manager 227 enables a user to specify permissions for elements of the interface ("element permissions"). An element permission specifies which records of an element (or multiple elements) a collaborator can view (e.g., view the record or view data linked to that record), edit, comment, or some combination thereof (thus specifying which cells of the database the collaborator can view, edit, etc. through the interface). For example, an element permission specifies whether a collaborator can view all records or only records associated with that collaborator. In a more specific example, if an element includes a list of projects (specified in a database), the element may display all projects to a collaborator or the element may only display projects assigned to that collaborator, depending on the element permission. In some embodiments, a user may be able to specify custom rules for an element permission. In these embodiments, the user may provide logical conditions describing who can view certain records. For example, cells marked as "secret" or "confidential" (in the database) can only be seen in an element by a predetermined set of collaborators or collaborators that meet a specified condition. An element permission may depend on the type of element. For example, an element permission for a multi-record element may specify which actions a user can perform (e.g., view, edit, or comment) to the multiple records displayed by that element, while an element permission for a single-record element may specify which actions a user can perform (e.g., edit it or not) to the single record displayed by that element.

FIGS. 4E and 4F are example element permission interfaces 425, 427 that enable a user to specify an element permission for an element. Element permission interfaces 425 and 427 may be displayed by the interface generator 403 when a user selects an element. The specifics of the element permission interface may depend on the type of element. As indicated in element permission interface 425, a user may enable a collaborator to view or edit records, in addition to adding/deleting records and allowing a collaborator to open record details. It also allows a user to specify whether a collaborator can view all records ("All records"), only records associated with the collaborator ("Viewer's records only"), or a custom set of records (Specific records"). As indicated in element permission 427, a user may enable a collaborator to filter, sort, and search records; click into record details; edit records; and add records.

Since an element permission is specific to an element (or multiple elements), an interface may include multiple elements, each with a different element permission. For example, a first element in an interface may allow a collaborator to view but not edit all records, a second element in the interface may allow the collaborator to only view records associated with that collaborator but the collaborator can edit those records, and a third element may have a custom element permission which, for example, enables some collaborators to view and edit a set of records but prohibits other collaborators from seeing (or editing) that set of records. Thus, the combination of a user permission and element permissions enables a user to conveniently create highly customized interfaces that display tailored information to each collaborator. Furthermore, the combination of a user permission and element permissions for an interface may result in each collaborator viewing different records in different elements of the interface.

If a first element is connected or associated with (e.g., dependent on) a second element, the element permission of the second element may affect the element permission of the first element. For example, if (a) a first element lists projects and a second element lists tasks for each project in the first list and (b) the element permission of the first element only allows a collaborator to view records (in this case, projects) associated with that collaborator, then the second element may only list tasks for projects that the collaborator is associated with (instead of listing tasks for all projects). Said differently, element permissions may affect each other when the elements are linked to each other. For example, a user may choose whether an element listing tasks for a project should only show tasks for the selected project (e.g., creating a link) or whether it should just show a static set of tasks (e.g., remaining unlinked). Elements may be connected or associated with each other if the elements are configured to display data from cells that are related to each other in the database.

I.B Generating a Policy Object

After the interface manager 227 generates an interface (e.g., based on a user interacting with the interface generator 403), the policy object module 237 may generate a policy object for the interface. A policy object for an interface specifies which permissions (also "access control policies") are granted by that interface for a given user. More specifically, a policy object specifies which cells of the database can be accessed (e.g., read or edited) by a user interacting with the interface. The policy may specify this for all users who can interact with the interface. The policy object may also specify which actions a user can perform to the interface, such as whether a collaborator can delete rows or clear cells. The policy object prevents unauthorized users (users not specified by the user permission) from accessing the interface. The policy object also prevents a collaborator from viewing or editing records in the interface they are not authorized to view or edit (specified by the element permissions).

The policy object module 237 may generate the policy object based on the user permission and the element permissions of the interface. Thus, the policy object module 237 may generate a new (e.g., unique) policy object for each interface generated by the interface manager 227. Furthermore, since interfaces can be dynamically modified and changed, the policy object module 237 may regularly update the policy object or generate a new policy object if an interface is modified. This is further described below.

To generate the policy object, the policy object module 237 may aggregate the user permission and the element permissions together. The policy object module 237 may traverse the schema of the interface and compile the policy object. For example, the policy object module 237 traverses the (e.g., entire) interface and analyzes each element of the interface to determine what information they will use to render properly (e.g., table name, column name, column type, cell values). More specifically, for each element in an interface, the policy object module 237 determines which cells of the database that element grants access to based on the associated element permission.

In some embodiments, the policy object includes a list of rules. The policy object may include a dependency graph, which specifies how access to individual cells, rows, columns, tables, etc. of the database are linked together. Said differently, a dependency graph may specify a hierarchy of permissions for the database. A dependency graph is useful because often access to a portion of the database (e.g., a cell) is dependent on access to another portion of the database (e.g., another cell). For example, if the database includes a table with rows and columns, the policy object may include a table policy specifying which actions can be performed to that table and which users are allowed to perform those actions (said differently, the table policy specifies which users can access (e.g., read or write) the table). The table policy may include a column policy (e.g., for each column of the table). A column policy specifies which actions can be performed to that column and which users are allowed to perform those actions. A column policy may include a row policy (e.g., for each cell of the column). A row policy specifies which actions can be performed to row cells of a given column and which users are allowed to perform those actions. Thus, the ability to access a cell may require access to the row of that cell, which may require access to the column of that cell, which may require access to the table. Thus, for example, if a collaborator has access to the table, but not the column or row of a cell, the user may not have access to that cell. In this way the table policy (with the included column and row policies) specifies who can access each cell of the table.

I.C Enforcing the Policy Object

To implement an interface (e.g., to display and allow a user to interact with an interface), the interface generator 247 provides an instance of the interface to a client device 140 (e.g., generates the interface on a client device 140). For example, the interface generator 247 provides the interface to a collaborator via their client device 140. The interface generator 247 may provide an instance of the interface via a webpage.

The interface generator 247 may provide a local instance of the interface to a client device 140 associated with a user in response to a query from the client device 140. Furthermore, to continue implementing the interface, the client device 140 may transmit queries to server 110. More specifically, as previously described, an interface includes records that display data from cells of a database (or multiple databases). To retrieve this data so it can be displayed in the interface, a client device 140 may send queries to the server 110. Furthermore, a user may edit cells of a database by interacting with an interface. These edits may also be implemented via queries transmitted to the server 110. Queries for data may be sent for other reasons as well. As used herein, a query is an access request associated with a user. There may be different query types, such as a "read" query, a "write" query, and a "schema change" query. A read query is a request to read data in a cell (or multiple cells) of a database. If a read query from a client device is granted, a standing data connection (also "persistence data connection") may be established between the instance of the user interface on the client device and the cell (or cells) of the database. Due to a standing data connection, if data in the cell (or multiple cells) is edited, the updated data will be automatically transmitted to the client device (e.g., without the client device sending a subsequent read query for that cell (or cells)). A write query is a request to write/edit data in a cell (or multiple cells) of a database. A schema change query is a request to change the interface itself e.g., to edit an element of the interface.

The policy enforcer 257 receives queries for an interface from a client device 140 and determines via the policy object (for that interface) whether the queries should be granted or denied. Said differently, the policy object is used to filter the data sent to a client device 140 and used to reject writes to data that's not (a) visible and (b) editable to the user, resulting in the client device 140 only receiving data from the server 110 it is authorized to receive. For example, the policy enforcer 257 references a policy object to determine whether a collaborator associated with a query has access to (or the ability to edit) a cell of a database.

The policy enforcer 257 may sequentially process queries (e.g., in a queue) for an interface or database, even if the queries are received from different client devices 140. Said differently, queries may be processed one at a time. For example, if a granted first query changes a collaborator assigned to a project from collaborator "A" to collaborator "B" (e.g., a relation between table 305 and 301 in FIG. 3 is changed such that collaborator "B" is now able to edit the project but collaborator "A" is now prevented from editing the project) and a second subsequent query from collaborator "A" (e.g., received directly after the first query) attempts to change one of the tasks of the project, the second query may be rejected since collaborator "A" is no longer assigned to the project. The order in which the queries are processed may be based on when they were received by the server 110 or sent by a client device 140. Processing queries sequentially may help prevent query conflicts and helps enable real time collaboration between users on the same interface.

In embodiments where the policy object includes a dependency graph, the policy enforcer 257 may determine whether a query (e.g., to access a cell) should be granted by traversing the dependency graph to determine if there is any path that grants access (e.g., to that cell). For example, if a query associated with a user is requesting access to a cell in a table, the policy enforcer 257 may first determine whether policy object includes a table policy that grants the user access to that table. If so, the policy enforcer 257 may then determine whether the table policy includes a column policy that grants the user access to the column of the requested cell. If so, the policy enforcer 257 may then determine whether the column policy includes a row policy that grants the user access to the row of the requested cell.

I.D Updating the Policy Object

In some cases, the action of a query (accepted by the policy enforcer 257) changes the interface (or the underlying database) such that the policy object becomes outdated or inadequate for the new interface. In these situations, the policy object module 237 may (e.g., responsive to determining the policy object is inadequate) update or reconstruct the policy object (e.g., generate a new policy object) based on the change. The policy object module 237 may dynamically react in real time to these changes. Example changes that may render a policy object inadequate include changes to the schema of the interface, such as deleting a table or column of the database, changing a column type of a column in the database, or updating the page layout of the interface. For example, if the action affects the interface itself (e.g., edits an element of the interface or adds a new element), the current policy object may be deleted and the policy object module 237 may generate a new policy object based on the updated interface. In this situation, if any collaborators are accessing the interface, the server 110 may request each client device 140 to refresh their interface so the new policy object can be implemented and enforced.

As previously described, the policy enforcer 257 may sequentially process queries for an interface. If the policy object module 237 updates or generates a new policy object responsive to a granted query, the policy enforcer 257 may wait until the policy object module 237 is done before the next query (e.g., in the queue) is processed. Among other advantages, this helps prevent query conflicts that may occur if queries were processed in parallel or if the policy enforcer 257 did not wait until the policy object module 237 was done updating a policy object (or generating a new policy object). Thus, the policy enforcer 257 may eventually deny a subsequent query after referencing the updated policy object (even though the previous (un-updated) policy object would have granted the second query).

In some situations, after a new policy object is generated (or updated), queries that were previously granted (according to the old policy object) may be reevaluated (e.g., by the policy enforcer 257) to determine whether those previous queries should be granted according to the new policy object. For example, the policy enforced 257 reevaluates (e.g., all) granted read queries that established a standing data connection (thus helping prevent client devices from receiving data via that standing data connection that they no longer have access to according to the new policy object). Queries may be reevaluated when the dependencies used to grant those queries are affected by a change (that resulted in the new policy object). For example, a previously granted query may be revaluated: (a) if a row of the database is deleted that the previous query was authorized because of that row (e.g., the user could previously "see" a task because they were assigned the project, but the project is now deleted); (b) when a cell value is changed and the previous query was authorized because of that cell (e.g., a task is re-assigned from one collaborator to the other); and/or (c) when the time changes and the previous query was authorized based on the time (e.g., a collaborator only see tasks created within 24 hours and it is now more than 24 hours since the task was created).

I.E Payload Filtering

As previously described, due to a read query previously granted according to a policy object, an instance of a user interface on a first client device 140 associated with a user may have standing access to a set of cells of the database (previously referred to as a standing data connection but may also be referred to as the user interface "subscribing to"

or "having a subscription to" the set of cells). Thus, if any changes occur to those cells, those changes may be transmitted to the first client device 140 so that the interface displayed by that first client device is up to date. For example, if the second client device creates a new column of data, the new column of data may be transmitted to a first client device.

To do this, the payload module 267 accumulates changes to the database or to the interface. The payload module 267 packages those changes into a payload and transmits the payload to one or more client devices 140. The payload module 267 may transmit a payload responsive to a change, within a threshold time period (e.g., immediately) of a change, after a threshold number of changes occur or after a threshold amount of time has passed since the last payload transmission. Thus, a change made by one client device 140 (via a query) may be quickly propagated to (e.g., all) other client devices 140 accessing the interface. This may help create a rich and real time collaborative experience for the users.

However, as previously discussed, different collaborators may have restricted access to different sets of data in the database due to the user permission and element permissions of the interface. Thus, in many cases, the payload module 267 should not provide all changes to all client devices 140. Said differently, the payload module 267 should not blindly send the same payload to each client device 140 as this may result in a collaborator receiving data (e.g., sensitive information) they do not have access to. Thus, the policy enforcer 257 may inspect a payload to be transmitted to a client device 140 according to the policy object to determine whether the payload includes any data changes a collaborator associated with that client device does not have access to (e.g., by traversing a dependency graph of the policy object). If so, the policy enforcer 257 may filter out the unauthorized changes from the payload before the payload is transmitted to the client device 140. The policy enforcer 257 may perform this inspection for each payload for each client device 140.

Thus, each client device 140 may receive a customized or unique payload which only includes changes the user of the client device 140 is authorized to receive. In this way, a client device 140 may only receive data from the server 110 it is authorized to receive. Thus, an interface may only display data it is authorized to display. Among other advantages, customized payloads help increase data protection. In contrast, conventional systems may send all updates or data to a client device and then use an interface to only display select updates or select data. However, since the updates or data are stored on the client device, malicious actors may find ways to access restricted portions of those updates or data, thus exposing potentially sensitive information. Additionally, or alternatively, errors in interfaces of conventional systems may result in the interface displaying unintentional portions of the data set or the updates.

II. Example Methods

FIG. 5 illustrates a method 500 for implementing a customized data policy object for a user interface. In the example of FIG. 5, the method 500 is performed by server 110, however one or more steps of method 500 may instead be performed by a client device (e.g., within a browser running on client device 140A or 140B). Instructions for the method 500 may be stored as program code that is executable by a computing system (e.g., server 110). For example, the method may be performed using the functionality and data of the components of server 110 shown in FIG. 2. The steps may be performed in different orders. The method 300 can include greater or fewer steps than described herein. Additionally, the steps can be performed in different order, or by different components than described herein.

At step 510, the server 110 receives a schema of user interface comprising an arrangement of interface elements. The schema specifies the layout, organization, and structure of the interface. Each element is configured to display data from cells of a database.

At step 520, the server 110 receives a user permission for the user interface. The user permission specifies one or more users allowed to access the user interface. In some embodiments, the user permission further specifies an permission level for each of the one or more users. In these embodiments, the policy object (step 540) is generated further based on the permission levels.

At step 530, the server 110 receives an element permission for an interface element of the user interface. The element permission specifies data of the interface element accessible to users of the user interface.

At step 540, the server 110 generates a policy object for the user interface based on the user permission and the element permission. The policy object specifies which cells of the database can be accessed by the user interface. The policy object may be a list of rules specifying which cells of the database can be accessed by each of the one or more users. The policy object may prevent the client device associated with the user from accessing cells of the database the user is not authorized to access. In some embodiments, the policy object includes a dependency graph.

At step 550, the server 110 receives a query from a client device associated with a user to implement a local instance of the user interface.

At step 560, the server 110 serves the query according to the policy object by providing a local instance of the user interface. Providing the local instance includes providing data from the database that the user interface provides access to without providing other data from the database should not be accessible according to the policy object.

If the policy object includes a dependency graph, serving the query according to the policy object may include traversing the dependency graph to determine whether the user has access to a cell specified in the query.

In some embodiments, the method 500 further includes the server 110 receiving an update to one or more cells of the database. The server may record or track this update and any other updates to the cells or the interface. The server 110 generates a customized payload for the client device according to the policy object. The customized payload indicates changes to the one or more cells of the database that the user of the client device is authorized to access according to the policy object. The server 110 transmits the customized payload to the client device. The customized payload enables the client device to update the local instance of the user interface. In some embodiments, the server 110 aggregates the update, any additional updates to cells of the database, and any updates to the interface into a payload, and removes (e.g., filters out) updates in the payload that the user of the client device is not authorized to access according to the policy object.

In some embodiments, the method 500 further includes the server 110 receiving an update to the schema of the interface that renders the policy object inadequate. Responsive to determining this, the server 110 may render the policy object invalid, may update the policy object based on the update, generate a new policy object based on the update, or some combination thereof.

In some embodiments, the method 500 further includes the server 110 receiving multiple queries requesting access to cells of the database, and processing the multiple queries sequentially in a queue according to the policy object. Responsive to determining a first query in the queue affects a dependency of the policy object, the server 110 may delay processing subsequent queries in the queue until the policy object is updated or a new policy object is generated. In some embodiments, the server 110 processes the subsequent queries in the queue according to the updated policy object or the new policy object. Processing the subsequent queries in the queue may include the server 110 denying a subsequent query in the queue according to the updated policy object or the new policy object, where the subsequent query would have been accepted according to the policy object.

In some embodiments, the query is a read query and the method 500 further comprises, responsive to granting the read query according to the policy object, establishing a standing data connection between the database and the instance of the user interface. Due to the standing data connection, the server 110 may automatically send updated data to the instance of the user interface responsive to data changes in the database.

In the above descriptions, permissions are often described in the context of a single database, however this is not required. Permissions may be in the context of multiple different databases. For example, a policy object for an interface may specify which cells of multiple databases can be accessed by a user of the interface.

In the above descriptions, permissions are described relative to an interface. However, user may specify a user permission that specifies one or more users that can access a database (or multiple databases). This access may or may not grant access to an interface that displays data from that database (or multiple databases).

III. Computing System Architecture

Figure 6:
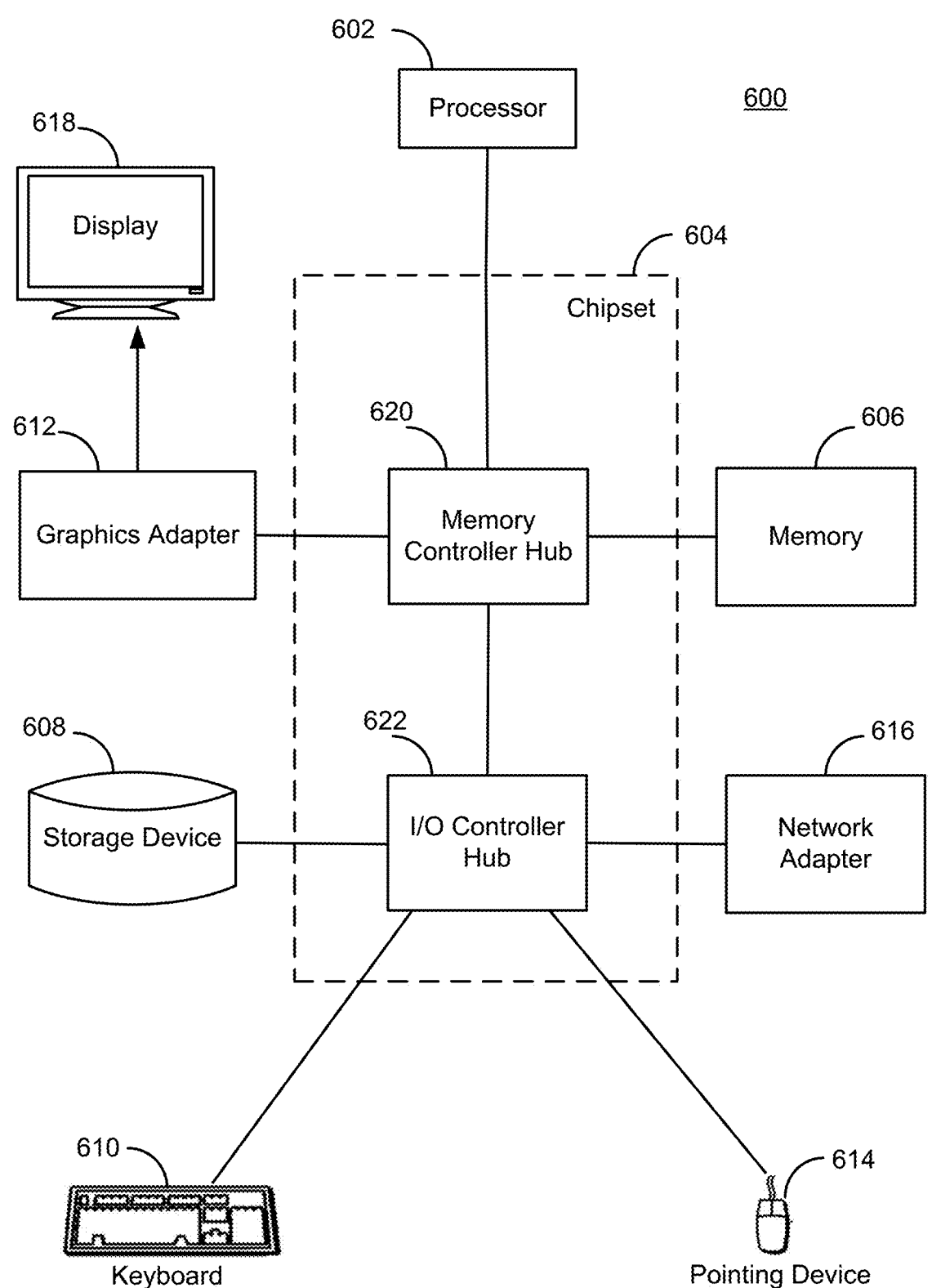
FIG. 6 is a block diagram illustrating an example computer suitable for use as the server or a client device.

FIG. 6 is a block diagram illustrating an example computer 600 suitable for use as the server 110 or a client device 140. The example computer 600 includes at least one processor 602 coupled to a chipset 604. If the computer 600 includes multiple processors 602, the processors may execute a task individually or collectively. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touchscreen, or other type of pointing device, and is used in combination with the keyboard 610 (which may be an on-screen keyboard) to input data into the computer system 600. The graphics adapter 612 displays images and other information on the display 618. The network adapter 616 couples the computer system 600 to one or more computer networks.

<center>IV. Additional Considerations</center>

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing partial synchronization of database tables. Thus, while particular embodiments and applications have been illustrated and described, it is to be understood that the described subject matter is not limited to the precise construction and components disclosed. The scope of protection should be limited only by the following claims.

What is claimed is:

1. A method comprising:
   providing a local instance of a user interface to a client device, the user interface comprising an arrangement of interface elements, wherein one or more of the interface elements are configured to display data from cells of a database;

receiving, from the client device, a query to access a set of one or more cells of the database;

accessing a policy object for the user interface specifying which cells of the database can be accessed by the user interface, wherein the policy object is based on an element permission for an interface element of the user interface, the element permission specifying data of the interface element accessible to users of the user interface; and processing the query according to the policy object, wherein processing the query comprises providing data from the database that the user interface provides access to without providing other data from the database that should not be accessible according to the policy object, wherein the policy object includes a dependency graph that specifies a hierarchy of permissions for cells of the database.

2. The method of claim 1, wherein the query is a read query, a write query, or a schema change query.

3. The method of claim 1, wherein the dependency graph includes a table policy, which includes a column policy, which includes a row policy.

4. The method of claim 1, wherein processing the query according to the policy object comprises: traversing the dependency graph of the policy object to determine whether any paths of the dependency graph grant access to the set of one or more cells of the database.

5. The method of claim 1, wherein processing the query according to the policy object comprises: determining which one or more cells of the set of one or more cells the policy object for the user interface provides access to.

6. The method of claim 5, wherein processing the query according to the policy object further comprises: denying access to a first cell of the set of one or more cells of the database.

7. The method of claim 6, wherein processing the query according to the policy object further comprises: granting access to a second cell of the set of one or more cells of the database.

8. The method of claim 1, wherein processing the query is part of a process comprising:
   receiving a plurality of queries to access cells of the database, wherein the plurality of queries includes the query; and
   processing the plurality of queries sequentially according to the order in which queries of the plurality of queries were received.

9. A method comprising:
   providing a local instance of a user interface to a client device, the user interface comprising an arrangement of interface elements, wherein one or more of the interface elements are configured to display data from cells of a database;
   receiving, from the client device, a query to access a set of one or more cells of the database;
   accessing a policy object for the user interface specifying which cells of the database can be accessed by the user interface, wherein the policy object is based on an element permission for an interface element of the user interface, the element permission specifying data of the interface element accessible to users of the user interface; and
   processing the query according to the policy object, wherein processing the query comprises providing data from the database that the user interface provides access to without providing other data from the database that should not be accessible according to the policy object, wherein processing the query is part of a process comprising:

receiving a plurality of queries to access cells of the database, wherein the plurality of queries includes the query; and processing the plurality of queries sequentially according to the order in which queries of the plurality of queries were received, wherein responsive to determining a first query of the plurality of queries affects a dependency of the policy object, delaying processing subsequent queries until the policy object is updated or a new policy object is generated.

10. The method of claim 9, wherein the policy object includes a dependency graph that specifies a hierarchy of permissions for cells of the database.

11. A non-transitory computer-readable storage medium storing instructions that, when executed by a computing system, cause the computing system to perform comprising:

providing a local instance of a user interface to a client device, the user interface comprising an arrangement of interface elements, wherein one or more of the interface elements are configured to display data from cells of a database;

receiving, from the client device, a query to access a set of one or more cells of the database;

accessing a policy object for the user interface specifying which cells of the database can be accessed by the user interface, wherein the policy object is based on an element permission for an interface element of the user interface, the element permission specifying data of the interface element accessible to users of the user interface; and processing the query according to the policy object, wherein processing the query comprises providing data from the database that the user interface provides access to without providing other data from the database that should not be accessible according to the policy object, wherein the policy object includes a dependency graph that specifies a hierarchy of permissions for cells of the database.

12. The non-transitory computer-readable storage medium of claim 11, wherein the query is a read query, a write query, or a schema change query.

13. The non-transitory computer-readable storage medium of claim 11, wherein the dependency graph includes a table policy, which includes a column policy, which includes a row policy.

14. The non-transitory computer-readable storage medium of claim 11, wherein processing the query according to the policy object comprises: traversing the dependency graph of the policy object to determine whether any paths of the dependency graph grant access to the set of one or more cells of the database.

15. The non-transitory computer-readable storage medium of claim 11, wherein processing the query according to the policy object comprises: determining which one or more cells of the set of one or more cells the policy object for the user interface provides access to.

16. The non-transitory computer-readable storage medium of claim 15, wherein processing the query according to the policy object further comprises: denying access to a first cell of the set of one or more cells of the database.

17. The non-transitory computer-readable storage medium of claim 16, wherein processing the query according to the policy object further comprises: granting access to a second cell of the set of one or more cells of the database.

18. The non-transitory computer-readable storage medium of claim 11, wherein processing the query is part of a process comprising:

receiving a plurality of queries to access cells of the database, wherein the plurality of queries includes the query; and processing the plurality of queries sequentially according to the order in which queries of the plurality of queries were received.

19. The non-transitory computer-readable storage medium of claim 18, wherein responsive to determining a first query of the plurality of queries affects a dependency of the policy object, delaying processing subsequent queries until the policy object is updated or a new policy object is generated.

20. A non-transitory computer-readable storage medium storing instructions that, when executed by a computing system, causes the computing system to perform operations comprising:

providing a local instance of a user interface to a client device, the user interface comprising an arrangement of interface elements, wherein one or more of the interface elements are configured to display data from cells of a database;

receiving, from the client device, a query to access a set of one or more cells of the database;

accessing a policy object for the user interface specifying which cells of the database can be accessed by the user interface, wherein the policy object is based on an element permission for an interface element of the user interface, the element permission specifying data of the interface element accessible to users of the user interface; and processing the query according to the policy object, wherein processing the query comprises providing data from the database that the user interface provides access to without providing other data from the database that should not be accessible according to the policy object, wherein processing the query is part of a process comprising:

receiving a plurality of queries to access cells of the database, wherein the plurality of queries includes the query; and processing the plurality of queries sequentially according to the order in which queries of the plurality of queries were received, wherein responsive to determining a first query of the plurality of queries affects a dependency of the policy object, delaying processing subsequent queries until the policy object is updated or a new policy object is generated.

21. The non-transitory computer-readable storage medium of claim 20, wherein the policy object includes a dependency graph that specifies a hierarchy of permissions for cells of the database.

* * * * *